United States Patent [19]

Kaneko

[11] Patent Number: 4,631,559

[45] Date of Patent: Dec. 23, 1986

[54] IMAGE FORMING METHOD

[75] Inventor: Shuzo Kaneko, Tokyo, Japan

[73] Assignee: Canon Kabushiki Kaisha, Tokyo, Japan

[21] Appl. No.: 660,989

[22] Filed: Oct. 15, 1984

[30] Foreign Application Priority Data

Oct. 18, 1983 [JP] Japan ............................... 58-195760

[51] Int. Cl.[4] ............................................ G01G 15/00

[52] U.S. Cl. .................................. 346/160; 355/3 R; 355/3 DD; 346/160.1

[58] Field of Search ............................ 346/153.1, 160; 355/3 R, 3 DD, 14 R, 3 TR, 16; 101/DIG. 13; 400/119; 358/300

[56] References Cited

U.S. PATENT DOCUMENTS 2,986,442 5/1961 Broding .............................. 346/160
4,134,668 1/1979 Coburn ................................ 346/160
4,396,275 8/1983 Oka et al. ......................... 355/3 BE
4,493,882 1/1985 Kaneko et al. ........................ 430/97
4,541,706 9/1985 Kishi ...................................... 355/3
4,547,787 10/1985 Kaneko et al. ...................... 346/160

*Primary Examiner*—Arthur G. Evans
*Attorney, Agent, or Firm*—Fitzpatrick, Cella, Harper & Scinto

[57] ABSTRACT

According to an image forming method wherein information light irradiates a conductive layer of a photosensitive body having the conductive layer and a photoconductive layer, a developing agent is supplied to the photoconductive layer of the photosensitive body while a bias voltage is applied between the conductive layer and the conductive developing agent, and an image corresponding to the information light is formed on the photosensitive body, contamination of the surface of the photosensitive body by the developing agent is prevented by voltage application upon image formation and operation timings of the respective components of an image display apparatus.

21 Claims, 5 Drawing Figures

IMAGE FORMING METHOD

BACKGROUND OF THE INVENTION

1. Field of the Invention

The present invention relates to an image forming method used in an image display apparatus for displaying data from a computer, a facsimile system or the like or in an electronic copying machine for exposing an original image and forming a copy image.

2. Description of the Prior Art

CRT (cathode-ray tube) type image display apparatuses for displaying data from computers, facsimile systems or the like have become widespread.

The arrangement of another conventional display apparatus using an endless belt, is illustrated in FIG. 1. Referring to FIG. 1, an endless belt photosensitive body (to be referred to as a photosensitive body hereinafter) 8 as an image carrier is looped around guide rolls 9, 10, 11 and 12 in a housing 1 and is intermittently driven by a driving means (not shown). An output laser beam from a semiconductor laser (not shown) modulated in response to an electrical image signal is scanned by a scanner 5 along one direction. Furthermore, the lower surface of the photosensitive body 8 is exposed through an $f-\theta$ lens 6 and a mirror 7. The photosensitive body 8 comprises a transparent conductive base and a photoconductive layer formed thereon.

A developing unit 15 is arranged to oppose the surface of an exposure position A of the photosensitive body 8. The developing unit 15 has a sleeve 17, and the sleeve 17 has a magnet 16 rotated in a direction indicated by an arrow in FIG. 1. Toner 18 as a developing agent with conductive and magnetic properties is supplied to the surface of the sleeve 17 and is adjusted by a blade 19 to a uniform thickness. The toner 18 is then applied to the surface of the photosensitive body 8. A DC voltage from a DC voltage source (not shown) is applied between the sleeve 17 of the developing unit 15 and the base of the photosensitive body 8. Rollers 13 and 14 are arranged in the vicinity of an exposure and development portion. The photosensitive body 8 is kept flat to keep a constant distance between the surface of the photosensitive body 8 and the sleeve 17 of the developing unit 15. A toner image is written on the surface of the photosensitive body 8 upon irradiation of the beam at the position A opposing the developing unit 15 and is transferred to a display section 2.

The display section 2 has a rectangular window hole 3 in the front surface of the housing 1. The toner image on the photosensitive body can be visually checked through a transparent member 4 covering the window hole 3. When a visible or toner image area coincides with the position of the window hole 3, the photosensitive body 8 is automatically or manually stopped for a desired period of time. The operator can visually check the toner image on the surface of the photosensitive body through the transparent member 4 mounted in the window hole 3.

A lamp 20 is optionally arranged to delete the history of the photosensitive body, if required. The lamp 20 is turned on while the photosensitive body is driven. However, the lamp 20 is turned off when the photosensitive body is stopped.

FIGS. 2 and 3 show an electrophotographic method disclosed in Japanese Patent Laid-Open Nos. 98746/1983 to 98749/1983 (corresponding to U.S. Ser. No. 445,070). The principle of image formation by the photosensitive body 8 in the apparatus shown in FIG. 1 will be described with reference to FIGS. 2 and 3.

FIG. 2 shows a charge state in a bright portion of information light. When the toner 18 applied with a voltage through the sleeve 17 is brought into contact with the photosensitive drum, an electric field is applied to a photoconductive layer 8*c*. In this case, when information light LB irradiates the photoconductive layer 8*c*, photocarriers e are generated in the photoconductive layer 8*c*. The photocarriers are guided by the electric field to the vicinity of the surface of the photoconductive layer 8*c*. As a result, a strong electrostatic attraction force acts between the toner 18 and the photoconductive layer 8*c*. The toner 18 is attracted to the photoconductive layer 8*c*, i.e., the surface of the photosensitive body 8. The sleeve 17 may be rotated while the magnet 16 is fixed.

In this example, the photoconductive layer 8*c* comprises an n-type semiconductor, and a positive voltage is applied to the toner 18. The carriers e generated from the photoconductive layer 8*c* in the vicinity of the substrate upon irradiation of the information light LB can be effectively guided toward the surface of the photoconductive layer 8*c*. A strong electrostatic attraction force acts between the toner 18 and the photosensitive body 8, so that the toner 18 is attached to the photosensitive body.

FIG. 3 shows a charge state of a dark portion of the information light. When an electric field is applied between the toner 18 and a transparent conductive layer 8*b* of the base, an electrostatic attraction force acts therebetween. However, since the photoconductive layer 8*c* is present between the toner 18 and the transparent conductive layer 8*b* and the toner 18 is spaced apart from the conductive layer 8*b*, the attraction force is small. The toner 18 is removed from the surface of the photoconductive layer, i.e., the surface of the photosensitive body 8 by a magnetic force of the rotary magnet 16 arranged in the sleeve 16 or by an attraction force acting between the toner particles.

In order to change the toner image on the photosensitive body 8, the photosensitive body 8 passes by the exposure position again to form a new toner image.

When the toner carrying portion of the photosensitive body becomes a toner noncarrying portion, the toner 18 having a reduced electrostatic attraction force is removed by the magnetic field of the magnet 16, thus obtaining the toner noncarrying bright portion. However, when the toner carrying portion of the photosensitive body remains stationary, the carriers e are again injected by information light. The toner 18 is held by the information light since the charge of the toner becomes larger than the magnetic field of the magnet 16. Therefore, the toner image on the surface of the photosensitive drum will not adversely affect the next image formation cycle. Any special cleaning means need not be provided.

Referring to FIGS. 2 and 3, a transparent conductive base 8*a* comprises a polyethyleneterephthalate film for supporting the conductive layer 8*b*. A voltage from a power source E is applied to the sleeve. When a normal photosensitive body 8 is used, a bias voltage of 100 to 500 V is applied to the body.

In the photosensitive body 8 having the construction described above, a nonimaging portion is predetermined at a seam of the photosensitive body 8 or before the photosensitive body 8 is driven at a constant speed.

In the apparatus shown in FIG. 1, reference symbols 8A and 8B denote first and second imaging areas. Areas 8C and 8D between the first and second imaging areas 8A and 8B serve as nonimaging areas, respectively.

In the apparatus having the nonimaging areas, image formation cannot be performed until the photosensitive body 8 reaches a predetermined speed. For this reason, the developing unit 15 is arranged in the manner shown in FIG. 1. One of the nonimaging areas 8C and 8D always opposes the developing unit 15 when the apparatus is stopped. In this state, the toner on the sleeve 17 is in contact with the photosensitive body 8.

SUMMARY OF THE INVENTION

As described above, when the apparatus is stopped while the developing unit opposes the nonimaging area, and the image is repeatedly formed, strip-like toner contamination occurs at a portion of the nonimaging area which opposes the developing unit. The toner is introduced through a pinhole of the nonimaging area, resulting in contamination by the toner. It is found that this is caused by the DC voltage applied between the photosensitive body and the sleeve. When an excessive current flows through the toner on the sleeve upon application of the DC voltage, the toner is attached to the nonimaging area. The above problem is also caused when the developing unit is separated from a means for separating a seam of the photosensitive body when the developing unit passes by the seam of the photosensitive body. Since a magnetic force generating means is separated from the nonimaging area and the magnetic force is decreased, the toner electrostatically attracted to the nonimaging area remains. In addition, when the apparatus remains in a stopped position while the toner is brought into tight contact with the nonimaging area for a long period of time, it is found that the nonimaging area is contaminated with the toner irrespective of voltage application and separation/contact of the developing unit with respect to the photosensitive body.

It is an object of the present invention to provide an image forming method using a photosensitive body, wherein the photosensitive body will not be contaminated with toner at the beginning or end of image formation and damage due to a pinhole and contamination with the toner are prevented.

In order to achieve the above object of the present invention, there is provided an image forming method of irradiating light onto a photosensitive drum having a photoconductive layer and a conductive layer, supplying a developing agent to the photosensitive body while a bias voltage is applied between the conductive layer and the conductive developing agent, and forming an image of the developing agent on the photosensitive body in accordance with the light irradiating the photosensitive body, comprising the steps of:

(a) stopping application of the bias voltage between said conductive layer and the conductive developing agent after irradiation of the information light is completed;

(b) stopping driving of said photosensitive body;

(c) stopping causing of the conductive developing agent to act on a developing agent carrying member;

(d) starting causing of the conductive developing agent to act from said developing agent carrying member onto said photosensitive body;

(e) starting driving of said photosensitive body with respect to said developing agent carrying member in a direction for forming an image; and (f) starting application of the bias voltage between said photosensitive body and the conductive developing agent.

In the above method, the photosensitive body is not limited to a belt but can be extended to a drum or a plate. When the developing agent comprises a magnetic toner, the toner can be attached by the magnetic force thereof to the photosensitive body. The steps (a) to (f) are preferably performed in the nonimaging area when the photosensitive body has imaging and nonimaging areas, thereby completely protecting the imaging area of the photosensitive body. Furthermore, in an apparatus using a method further including a step of bringing the photosensitive body into contact with or separating the photosensitive body from the developing agent on the developing agent carrying member, the toner carrying member such as a sleeve or a magnet roller is separated from the photosensitive body or brought into contact therewith to achieve these additional steps. When the ends of the photosensitive body are looped or an endless belt is used, and the coupling portion becomes thicker than any other portion, the toner carrying member is separated from the photosensitive body only when the member passes by the coupling portion, and thus the smooth movement of the photosensitive body can be achieved. Therefore, when the photosensitive body does not have such a coupling portion, the additional step need not be performed.

According to the method of the present invention, contamination of the photosensitive body with the toner upon the start/end of the image formation can be prevented. Damage caused by a pinhole in the photosensitive body can also be prevented. Therefore, the durability of the photosensitive body can be improved.

The steps (a) to (f) are ordered to restart the image forming cycle after the previous image formation cycle is completed. However, when the image formation cycle is started for the first time, the order of the steps will be steps (d), (e), (f), (a), (b) and (c) in sequence. The developing agent transfer from the developing agent carrying member may be started/stopped in synchronism with start/stop of the photosensitive body. In an apparatus having a developing means completely separated from the photosensitive body, steps (e) and (d) and/or steps (b) and (c) may be reversed.

DETAILED DESCRIPTION OF THE PREFERRED EMBODIMENT

The present invention will be described in detail with reference with a preferred embodiment.

Figure 5:
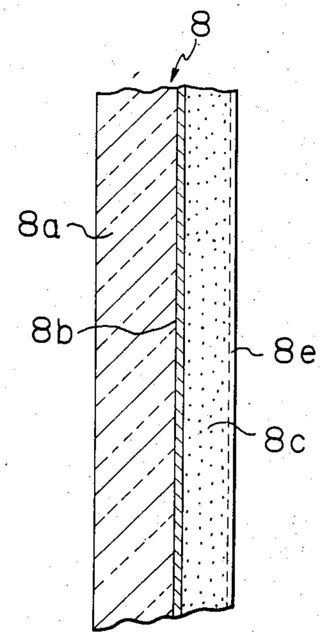
FIG. 5 is an enlarged sectional view of the photosensitive body.
Figure 4:
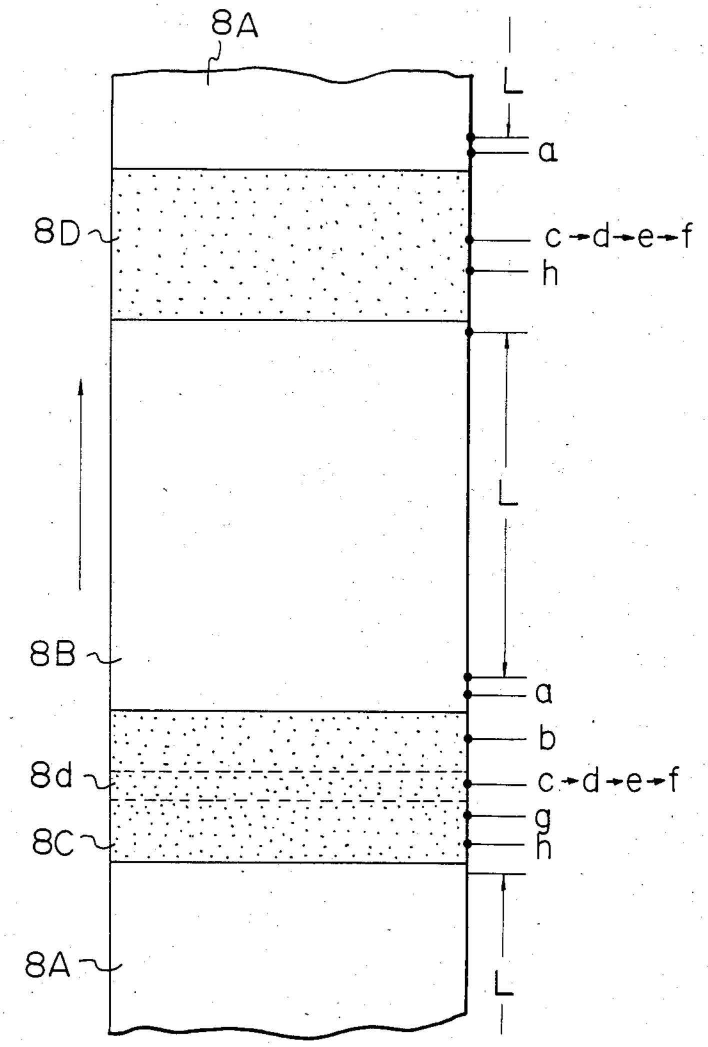
FIG. 4 is a plan view of a photosensitive body as an image carrying belt.

FIG. 4 is a plan view of a photosensitive body 8 for explaining timings of the respective steps of an image forming method according to the present invention, and FIG. 5 is an enlarged sectional view showing the part of the photosensitive body 8.

Referring to FIG. 5, an imaging area of the photosensitive body 8 basically comprises a conductive base 8*a* made of a known transparent plastic film, a deposition layer 8*b* made of an indium oxide-tin oxide, and a photoconductive layer 8*c*. The photoconductive layer 8*c* is made of a CdS layer containing copper and sensitized with indium. A binder layer 8*e* containing titanium oxide is formed on the surface of the CdS layer so as to make the surface whitish. When a black toner of the developing unit is used, high contrast between the black toner and the whitish surface of the binder layer 8*e* is achieved.

When a nonimaging area is formed in the photosensitive body, the surface of the nonimaging area of the photosensitive body 8 is covered with a black plastic film having the same color as the toner or is painted black. Since the nonimaging area need not have the function of the photosensitive body, the photoconductive layer 8*c* need not be formed in the nonimaging area.

Referring to FIG. 4, a direction indicated by an arrow indicates the direction of travel of the photosensitive body. Positions a, c to f and h of operations performed on the portion 8D of the photosensitive body correspond to steps (a) to (f) described above, respectively. Reference symbol L denotes an information light radiation area. The photosensitive body 8 has a coupling portion 8*d* at which two ends of a long belt are coupled. The coupling portion 8*d* includes a reinforcing member and has a thickness greater than any other portion of the photosensitive body 8.

A case wherein the image is formed on the photosensitive body according to the steps described above is compared with a case wherein the photosensitive body and the toner on the sleeve are simultaneously stopped when an image formation operation is performed in the same manner as the conventional method and the apparatus is stopped. According to this embodiment, when the photosensitive body is stopped while a bias voltage is being applied between the photosensitive body and the toner, contamination caused by the toner attached to the surface of the photosensitive body will not occur. In addition, a pinhole is not formed in the surface of the photosensitive body.

When the toner is not supplied after the photosensitive body is stopped, and the photosensitive body is started after the toner is supplied thereto, the photosensitive body is driven after it is brought into sliding contact with the toner. Since the photosensitive body is driven after the toner attached thereto is removed, the toner attached to the photosensitive body will not cause contamination.

The timings of the respective steps at the nonimaging area 8C with the coupling portion 8*d* will be described.

Figure 1:
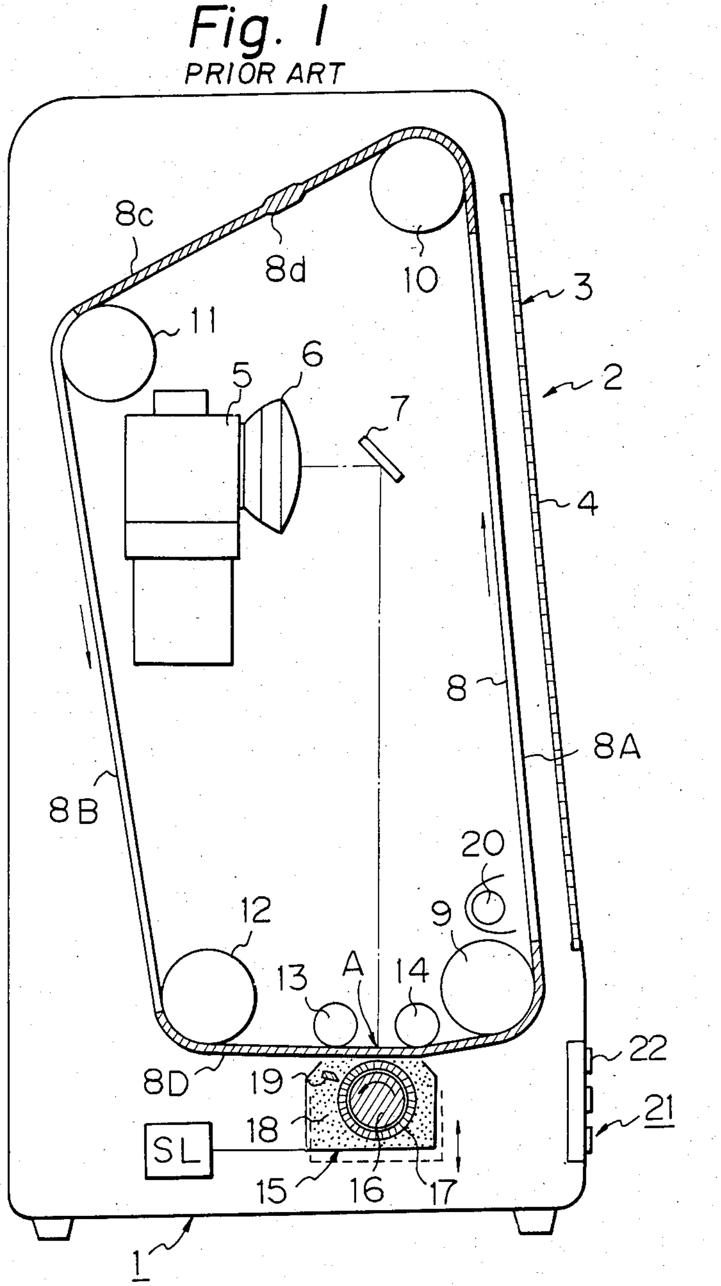
Fig. 1 PRIOR ART
FIG. 1 is a sectional view of an image display apparatus to which the present invention is applied.
Figure 2:
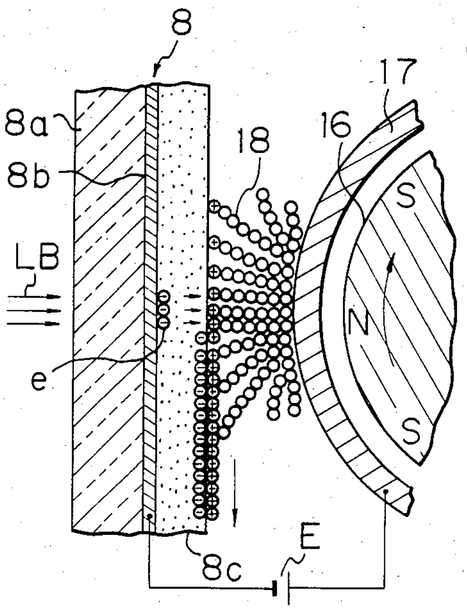
Fig. 2 PRIOR ART
FIGS. 2 and 3 are sectional views for explaining the principle of image formation in the apparatus.
Figure 3:
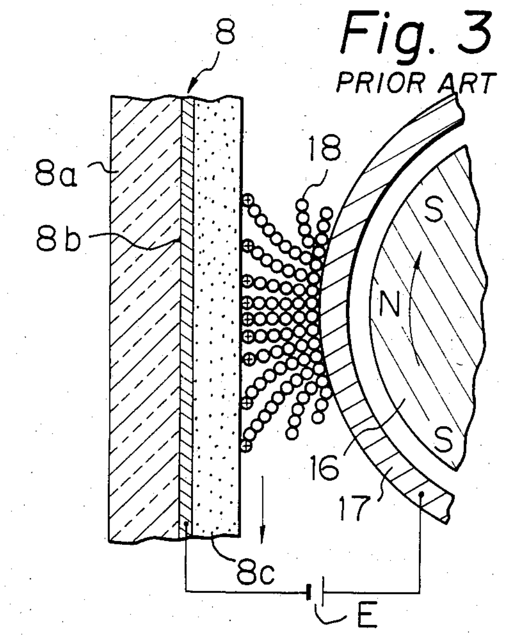
Fig. 3 PRIOR ART

After the irradiation of the information light onto the photosensitive drum is completed, and application of the bias voltage to the photosensitive body and the toner (a in FIG. 4) is stopped, the developing unit is removed from the photosensitive body (b in FIG. 4) to separate the toner from the photosensitive body. The separation mechanism comprises a driving means such as a cam or a solenoid (SL in FIG. 1) for separating the swingable developing unit from the photosensitive body. In this state, since the bias voltage is not applied between the photosensitive body and the toner, the toner can be removed by the magnetic force acting thereon from the toner carrying member. No adverse affect by the residual toner will occur.

When the image formation is interrupted, the belt and toner transfer are stopped (c and d, respectively in FIG. 4) while the toner is kept separated from the photosensitive body. In order to restart image formation, the toner transfer is started (e in FIG. 4), and thereafter the photosensitive body is started (f in FIG. 4). The developing unit is restored by the above mechanism to the image forming position, and the toner is supplied to the photosensitive body (g in FIG. 4). Thereafter, the bias voltage starts to be applied between the photosensitive body and the toner (h in FIG. 4). The steps (c) to (f) may be performed after the step (a) and before the step (b), or after the step (g) and before the step (h).

In the same manner as described above, the bias voltage is applied after the toner is brought into contact with the photosensitive body. Therefore, the toner will not be separated from the photosensitive body after the bias voltage is applied between the photosensitive body and the toner, thereby preventing leakage of the bias voltage and damage caused by a pinhole formed in the photosensitive body.

When the photosensitive body comprises an endless belt or a drum, the coupling portion 8*d* is not present. In this case, the mechanism for separating the toner from the photosensitive body or bringing the toner into contact therewith need not be used.

In the above embodiment, the respective steps performed in the nonimaging area have been described. However, as a modification, the information light irradiates the imaging area of the photosensitive body, and any other step is performed in the nonimaging area. When an endless belt type photosensitive body has the entire surface constituting only the imaging area, the nonimaging area need not be considered. In this case, the steps described above can be performed without modifications.

In order to completely eliminate poor appearance caused by toner contamination when a nonimaging area is present, it is very effective to color the nonimaging area with the same color as the toner. In order to prevent the bias voltage leakage, the surface of the nonimaging area of the photosensitive body has a high resistivity of more than $10^{13}$ Ω·cm inclusive, thereby preventing damage to the photosensitive body and contamination caused by the damage to the photosensitive body.

The photosensitive body is prevented from contamination at the beginning/end of image forming process and from damage caused by a pinhole. As a result, the durability of the photosensitive body can be improved. At the same time, the degradation of image quality which is caused by toner contamination can be prevented. In addition, the nonimaging area is also free from toner contamination.

The image forming method of the present invention is not only applicable to the photosensitive body of the image display apparatus described above but also to a recording apparatus or a copying apparatus for transferring a toner image from a photosensitive body to a transfer medium. The information light is not limited to the light beam described with reference to the embodiment, but can be extended to signal light from an LED element or a liquid crystal shutter. The information light may be obtained by slit exposure of an original image.

When the developing agent is preferably removed from the developing agent carrying member, it is preferably moved or slid along the surface of the photosensitive drum before the photosensitive body is driven. However, the developing agent transfer and photosensitive body driving may be simultaneously performed. When the photosensitive body is stopped, the developing agent may be simultaneously removed therefrom, or the transfer of the developing agent may be interrupted. At least one of the developing agent and the photosensitive body may be moved. The developing agent may be moved with respect to the photosensitive body. On the contrary, the photosensitive body may be moved with respect to the developing agent. When the photosensitive body is moved with respect to the developing agent, the photosensitive body may be damaged by a rigid brush. Therefore, when the photosensitive body is moved, the developing agent is preferably also moved.

When the developing agent is removed from the photosensitive body while the developing agent is stopped, the photosensitive body is slightly moved in a direction opposite to the direction of image formation and is then moved in the direction of image formation.

What is claimed is:

1. An image forming method of irradiating light onto a side of a photosensitive body having a photoconductive layer and a conductive layer, supplying a conductive developing agent to the photosensitive body while a bias voltage is applied between the conductive layer and the developing agent, and forming an image of the developing agent on the photosensitive body in accordance with the light irradiating the photosensitive body, comprising the sequentially performed steps of:

- starting supplying said photosensitive body with the developing agent from the side opposing the light irradiated side of said photosensitive body and starting driving of said photosensitive body in a direction of image formation, which sub-steps are performed in any order;
- starting application of the bias voltage between said photosensitive body and the developing agent;
- stopping application of the bias voltage after irradiation of the light is completed and stopping driving of said photosensitive body, which sub-steps are performed in any order; and
- stopping supplying said photosensitive body with the developing agent.

2. A method according to claim 1, wherein the steps of the method are performed in a nonimaging area of said photosensitive body.

3. A method according to claim 2, wherein said nonimaging area of said photosensitive body has a surface having the same color as that of the developing agent.

4. A method according to claim 2, wherein said nonimaging area of said photosensitive body has a high resistivity.

5. A method according to claim 1, wherein an image formed by the developing agent on said photosensitive body can be visually observed.

6. An image forming method of irradiating light onto a side of a photosensitive drum having a photoconductive layer and a conductive layer, supplying a conductive developing agent to the photosensitive body while a bias voltage is applied between the conductive layer and the developing agent, and forming an image of the developing agent on the photosensitive body in accordance with the light irradiating the photosensitive body, comprising the steps of:

- upon completion of image formation,
- stopping application of the bias voltage when irradiation of the light is completed, and
- separating the developing agent from said photosensitive body and stopping driving of said photosensitive body, which sub-steps are performed in any order; and
- upon start of image formation,
- starting driving of said photosensitive body and starting bringing the developing agent into contact with said photosensitive body from the side opposing the light irradiated side of said photosensitive body, which sub-steps are performed in any order, and
- starting application of the bias voltage between said photosensitive body and the developing agent, thereby forming an image on said photosensitive body.

7. A method according to claim 6, wherein the developing agent is separated from said photosensitive body by separating a developing agent carrying member from said photosensitive body.

8. A method according to claim 6, wherein at least the steps other than stopping application of the bias voltage are performed in a nonimaging area of said photosensitive body.

9. A method according to claim 7, wherein said developing agent carrying member transfers the developing agent after stopping application of the bias voltage.

10. A method according to claim 9, wherein said developing agent carrying member transfers the developing agent before starting bringing the developing agent into contact with said photosensitive body.

11. A method according to claim 8, wherein said nonimaging area of said photosensitive body has a surface having the same color as that of the developing agent.

12. A method according to claim 8, wherein the surface of said nonimaging area of said photosensitive body has a high resistivity.

13. An image forming method of irradiating light onto a side of a photosensitive body having a photoconductive layer and a conductive layer, supplying a conductive developing agent to the photosensitive body while a bias voltage is applied between the conductive layer and the developing agent, and forming an image of the developing agent on the photosensitive body in accordance with the light irradiating the photosensitive body, comprising the sequentially performed steps of:

- starting supplying said photosensitive body with the developing agent from the side opposing the light irradiated side of said photosensitive body;
- starting application of the bias voltage between said photosensitive body and the developing agent;
- stopping application of the bias voltage when image formation is completed;
- stopping driving of said photosensitive body; and
- stopping supplying said photosensitive body with the developing agent.

14. A method according to claim 1, wherein the substeps of starting supplying said photosensitive body with the developing agent and starting driving of said photosensitive body are performed substantially simultaneously.

15. A method according to claim 1, wherein the substeps of stopping application of the bias voltage and stopping driving of said photosensitive body are performed substantially simultaneously.

16. A method according to claim 1, wherein the substeps of starting supplying said photosensitive body with the developing agent and starting driving of said photosensitive body are performed substantially simultaneously and the sub=steps of stopping application of the bias voltage and stopping driving of said photosensitive body are performed substantially simultaneously.

17. A method according to claim 6, wherein the sub-steps of separating the developing agent from said photosensitive body and stopping driving of said photosensitive body are performed substantially simultaneously.

18. A method according to claim 6, wherein the sub-steps of starting driving of said photosensitive body and starting bringing the developing agent into contact with said photosensitive body are performed substantially simultaneously.

19. A method according to claim 6, wherein the sub-steps of separating the developing agent from said photosensitive body and stopping driving of said photosensitive body are performed substantially simultaneously and the sub-steps of starting driving of said photosensitive body and starting bringing the developing agent into contact with said photosensitive body are performed substantially simultaneously.

20. A method according to claim 6, wherein an image formed by the developing agent on said photosensitive body can be visually observed.

21. A method according to claim 13, wherein an image formed by the developing agent on said photosensitive body can be visually observed.

* * * * *